United States Patent [19]
Shiga

[11] Patent Number: 6,028,595
[45] Date of Patent: Feb. 22, 2000

[54] TOUCH-SCREEN DISPLAY

[75] Inventor: Satoru Shiga, Kanagawa, Japan

[73] Assignee: Ricoh Company, Ltd., Tokyo, Japan

[21] Appl. No.: 08/925,646

[22] Filed: Sep. 9, 1997

[30] Foreign Application Priority Data

Sep. 9, 1996 [JP] Japan .................................. 8-260237

[51] Int. Cl.$^7$ .................................................. G09G 5/00
[52] U.S. Cl. ........................ 345/173; 345/178; 345/179
[58] Field of Search .................................. 345/156, 157, 345/158, 173, 175, 177, 178, 179, 180, 181, 182; 178/18.01–18.11, 19.01–19.07

[56] References Cited

U.S. PATENT DOCUMENTS

| | | | |
|---|---|---|---|
| 5,341,155 | 8/1994 | Elrod et al. | 345/179 |
| 5,534,886 | 7/1996 | Nomura et al. | 345/104 |
| 5,854,449 | 12/1998 | Adkins | 345/179 |

FOREIGN PATENT DOCUMENTS

| | | |
|---|---|---|
| 5-224816 | 9/1993 | Japan . |
| 7-141109 | 6/1995 | Japan . |
| 7-210317 | 8/1995 | Japan . |

*Primary Examiner*—Dennis-Doon Chow
*Attorney, Agent, or Firm*—Oblon, Spivak, McClelland, Maier & Neustadt, P.C.

[57] ABSTRACT

A touch-screen display which is able to prevent a displacement of a display position and a touch position. The touch-screen display includes a pointing pen for pointing to a position on the touch panel, and which may represent a position of an operator's eye. Moreover, the touch-screen display includes a correction unit for correcting the pointing position pointed to by the pointing pen. Therefore, the displacement of display position and a touch position caused by an angle of an operator's line of sight can be compensated for.

18 Claims, 5 Drawing Sheets

FIG. 5

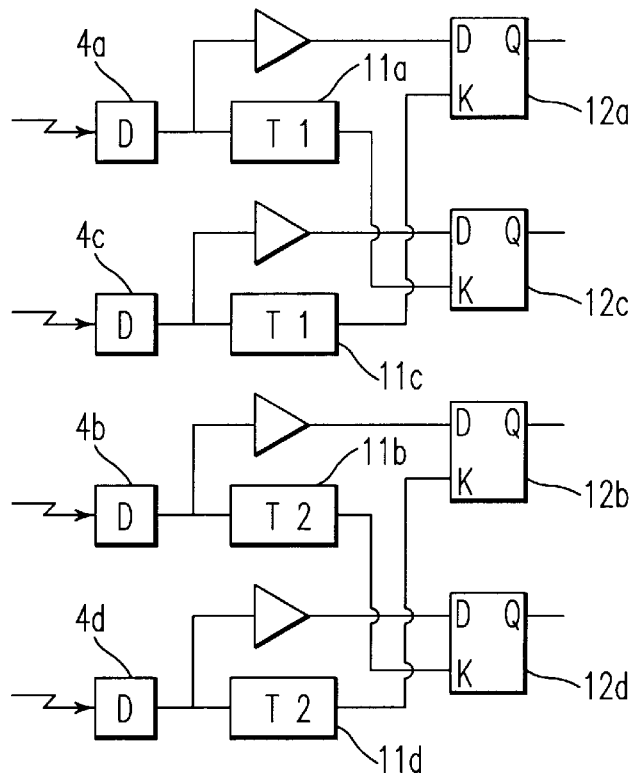

FIG. 6

| X-DIRECTION | Y-DIRECTION | POSITION OF OPERATOR'S EYE (FIG.7) | CORRECT VALUE | |
|---|---|---|---|---|
| | | | X-AXIS | Y-AXIS |
| $Tx < -T1$ | $T2 < Ty$ | $H_1V_3$ | $+\alpha$ | $-\beta$ |
| $-T1 < Tx < T1$ | $T2 < Ty$ | $H_2V_3$ | 0 | $-\beta$ |
| $T1 < Tx$ | $T2 < Ty$ | $H_3V_3$ | $-\alpha$ | $-\beta$ |
| $Tx < -T1$ | $-T2 < Ty < T2$ | $H_1V_2$ | $+\alpha$ | 0 |
| $-T1 < Tx < T1$ | $-T2 < Ty < T2$ | $H_2V_2$ | 0 | 0 |
| $T1 < Tx$ | $-T2 < Ty < T2$ | $H_3V_2$ | $-\alpha$ | 0 |
| $Tx < -T1$ | $Ty < -T2$ | $H_1V_1$ | $+\alpha$ | $+\beta$ |
| $-T1 < Tx < T1$ | $Ty < -T2$ | $H_2V_1$ | 0 | $+\beta$ |
| $T1 < Tx$ | $Ty < -T2$ | $H_3V_1$ | $-\alpha$ | $+\beta$ |

TOUCH-SCREEN DISPLAY

BACKGROUND OF THE INVENTION

1. Field of the Invention

This invention relates to a touch-screen display, which may be set on a personal computer, a mobile computer, etc., as a displaying and pointing device, and particularly, this invention relates to a touch-screen display with a function of eliminating an input error caused by a difference between a displayed point and a touched point by an angle of a line of sight.

2. Discussion of the Background

Touch-screen displays have been set on a personal computer, a mobile computer, etc. as a displaying and pointing device. These touch-screen displays have a display apparatus and an invisible touch panel, and the invisible touch panel is set over the display apparatus. In these touch-screen displays, some icons, characters, etc., are displayed on the display apparatus. An operator touches the icons, characters, etc., displayed on the display apparatus, and a touch point is detected and thereby the operator's input is detected. In addition, characters can be input by a handwriting input using an input pen.

FIGS. 8a and 8b show a section view of a touch-screen display. A touch panel 3 is set over a display panel 2, for example a LCD (a liquid crystal display). Because the touch panel 3 is invisible, an operator sees icons, characters, etc., displayed on the display panel 2. In this touch-screen display, when a point just above an icon displayed on the display panel 2 is touched, this icon is selected.

As shown in FIGS. 8a and 8b, a gap G exists between the display panel 2 and the touch panel 3. FIG. 8a shows a case that an operator sees the display panel 2 from just above an icon "A" displayed on the display panel 2. In this case, the icon "A", a point B on the touch panel above the icon "A" and the operator's eyes are all in a line. Therefore, when the operator selects the icon "A", the point B is touched and the icon "A" is selected.

On the other hand, FIG. 8b shows a case that an operator sees the display panel 2 from a point not above the icon "A" displayed on the display panel 2. In this case, the icon "A", point B and the operator's eyes are not all in a line, and instead the icon "A", point B' and the operator's eyes are all in a line. However, the point B' is not located just above the icon "A". Therefore, when the operator selects the icon "A", the point B' is touched, and as a result the icon "A" may not be selected. In addition, in a case of a handwriting input, wrong information may be input.

Japanese Patent Laid-Open No. 5-224816 shows a touch-screen display for preventing the problem just described. This touch-screen display has a two-layer touch panel. In this touch-screen display, first, in operator touches the first layer touch panel. A touching point is displayed and thereby the operator can evaluate a difference between a displayed point and a touched point resulting from any deviation in an angle of a line of sight. Next, the operator touches the second layer touch panel for an input.

The above-mentioned touch-screen display in Japanese Patent Laid-Open No. 5-224816 has some problems. First, the operator has to operate knowing a difference between a displayed point and a touched point resulting from any deviation in an angle of a line of sight at each input, and therefore an operation is complicated. Second, when an operator touches the first layer touch panel knowing a difference between a displayed point and a touched point resulting from any deviation in an angle of a line of sight, by a strong touching by the operator, the second layer touch panel may be inadvertently touched too, and a wrong information may be thereby input. Third, the two-layer touch panel may is expensive.

Japanese Patent Laid-Open No. 7-210317 also shows a touch-screen display, and in this touch-screen display, a touch panel automatically moves according to an angle of tilting of a display panel. Moreover, Japanese Patent Laid-Open No. 7-141109 shows a touch-screen display which has a light-producing device on a handset of a phone and more than one photoreceptor around a display panel. The photoreceptors receive light from the light-producing device on a handset and a position of the handset is detected, and a position of displaying and the touch panel is corrected.

The above-mentioned touch-screen display in Japanese Patent Laid-Open No. 7-210317 is complicated because this touch-screen display has to move the touch panel. Further, the touch-screen display in Japanese Patent Laid-Open No. 7-141109 requires a specialized handset.

SUMMARY OF THE INVENTION

Accordingly, an object of the present invention is to provide a novel touch-screen display which obviates the above-mention problems.

To achieve the objects, the present invention provides a novel touch-screen display which has a display panel and a touch panel which is layered on the display panel, and further having a pointing pen for pointing to a position on the touch panel and inputting a position of an operator's eye, a detecting unit for detecting a position of the pointing pen as a position of the operator's eye, a correction value decision unit for deciding a correction value according to the position of the pointing pen detected by the detecting unit, and a correcting unit for correcting a pointing position pointed by the pointing pen according to the correction value decided by the correction value decision unit. In this way, the present invention achieves an operation to provide a novel touchscreen display which is able to prevent a displacement between a display position and a touch position.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 5 is a circuit of a time difference decision of a touch-screen display according to the present invention;

FIG. 6 is a table for a decision of a correction value according to the present invention;

DESCRIPTION OF THE PREFERRED EMBODIMENTS

Figure 1:
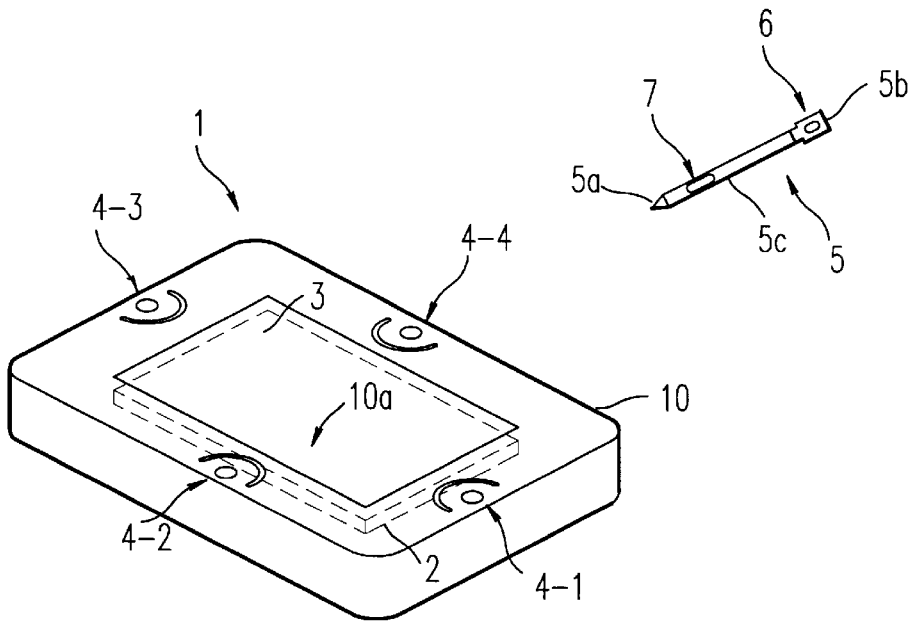
FIG. 1 is a diagram of a touch-screen display according to the present invention.

Referring now to the drawings, wherein like reference numerals designate identical or corresponding parts throughout the several views, FIG. 1 is a diagram of a touch-screen display 1 of the present invention and a pointing pen 5 for inputting a position. In FIG. 1, a touch-screen display 1 includes a display panel 2 and an invisible touch panel 3. The touch-screen display 1 has a rectangular display window 10a of a casing 10 and an operator can see the display panel 2 through the display window 10a. The display panel 2 may be a LCD (liquid crystal display).

The touch panel 3 is layered on the display panel 2 and is held by the casing 10. Four photoreceptors 4a, 4b, 4c and 4d are set on the casing 10. The photoreceptors 4a, 4b, 4c and 4d each may include a photodiode.

The pointing pen 5 includes a pen tip 5a, and the pen tip 5a can contact the touch panel 3 for an operator to input a position. The pointing pen 5 includes a light-producing device 6 on a pen head 5b and a communicating button 7 on a pen grip 5c. The light-producing device 6 may be an infrared light-emitting diode.

Figure 2:
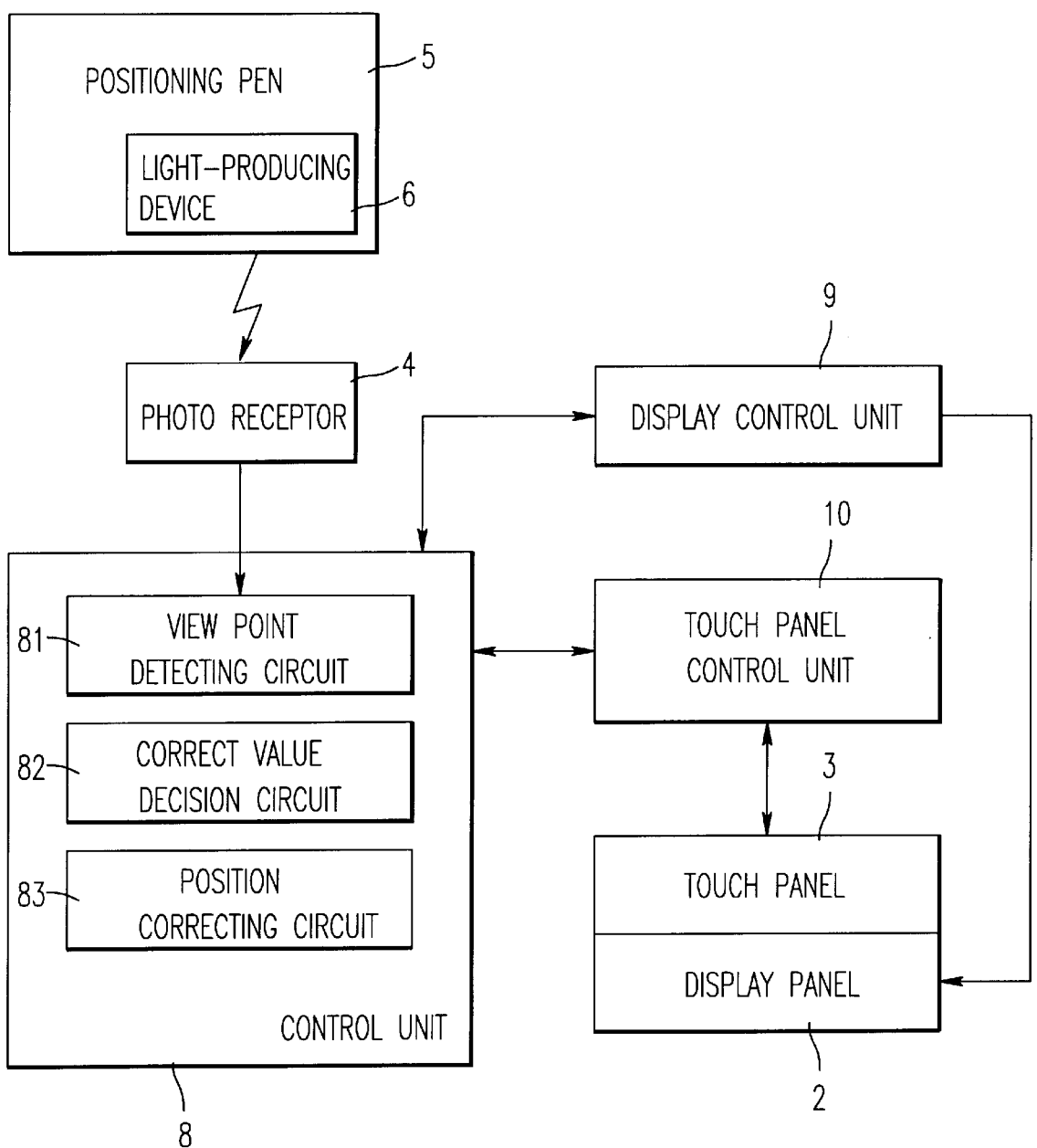
FIG. 2 is a block diagram of a touch-screen display according to the present invention.

FIG. 2 is a block diagram of the touch-screen display 1 of the present invention. In FIG. 2, the touch-screen display 1 includes a control unit 8 which controls all of the units of the touch-screen display 1, a display control unit 9 which controls the display panel 2 according to commands from the control unit 8, and a touch panel control unit 10 which calculates coordinate data of a touching position on the touch panel 3 according to information from the touch panel 3 and sends the coordinate data to the control unit 8. When the display panel 2 is used as a monitor of a personal computer, the control unit 8 can be shared with a control unit of the personal computer.

The control unit 8 includes a CPU, ROM and RAM (not shown) in which are stored programs, and the control unit 8 includes a correction value decision circuit 82, a position correcting circuit 83 and a view point detecting circuit 81. The view point detecting circuit 81 in the control unit 8 calculates a position of the light-producing device 6 as an operator's view point according to a time difference of receiving a light from the light-producing device 6 by the photoreceptors 4a, 4b, 4c and 4d. The correction value decision circuit 82 decides a correction value according to the position of the light-producing device 6 which is calculated by the view point detecting circuit 81, and the position correcting circuit 83 corrects an input position according to the correction value output from the correction value decision circuit 82.

Figure 4:
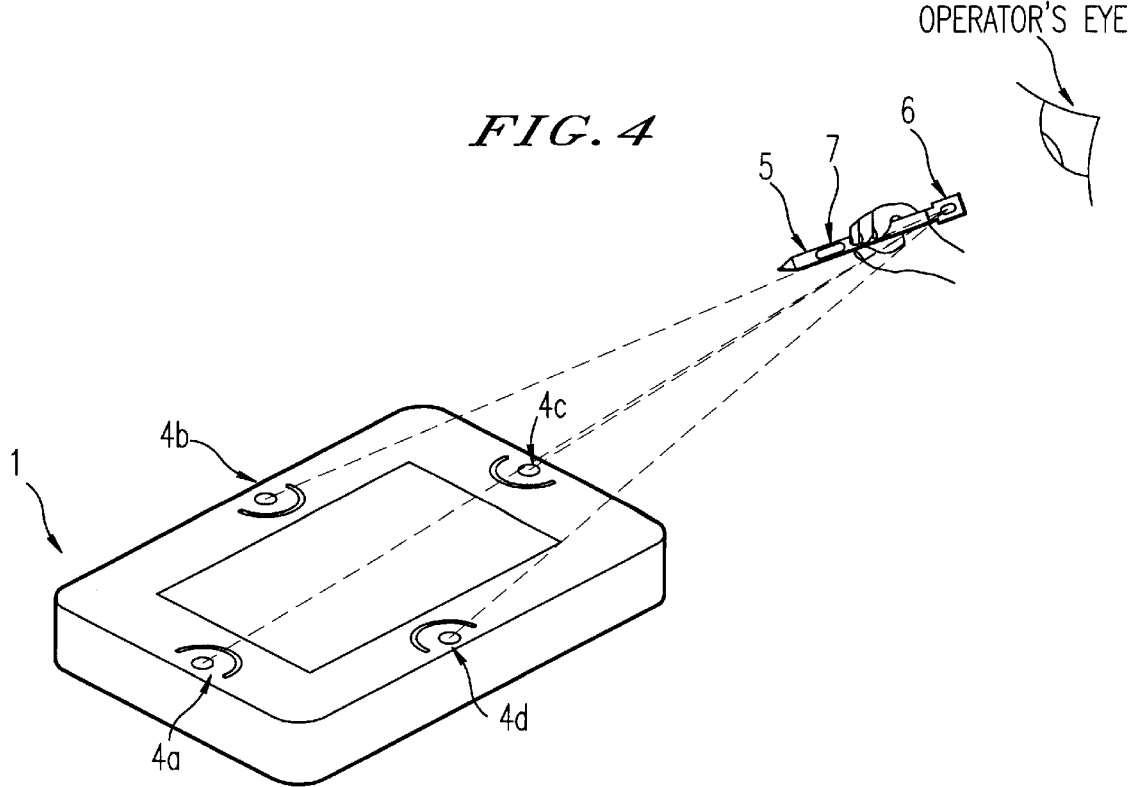
FIG. 4 is a diagram of a pointing pen and a touch-screen display according to the present invention.
Figure 3:
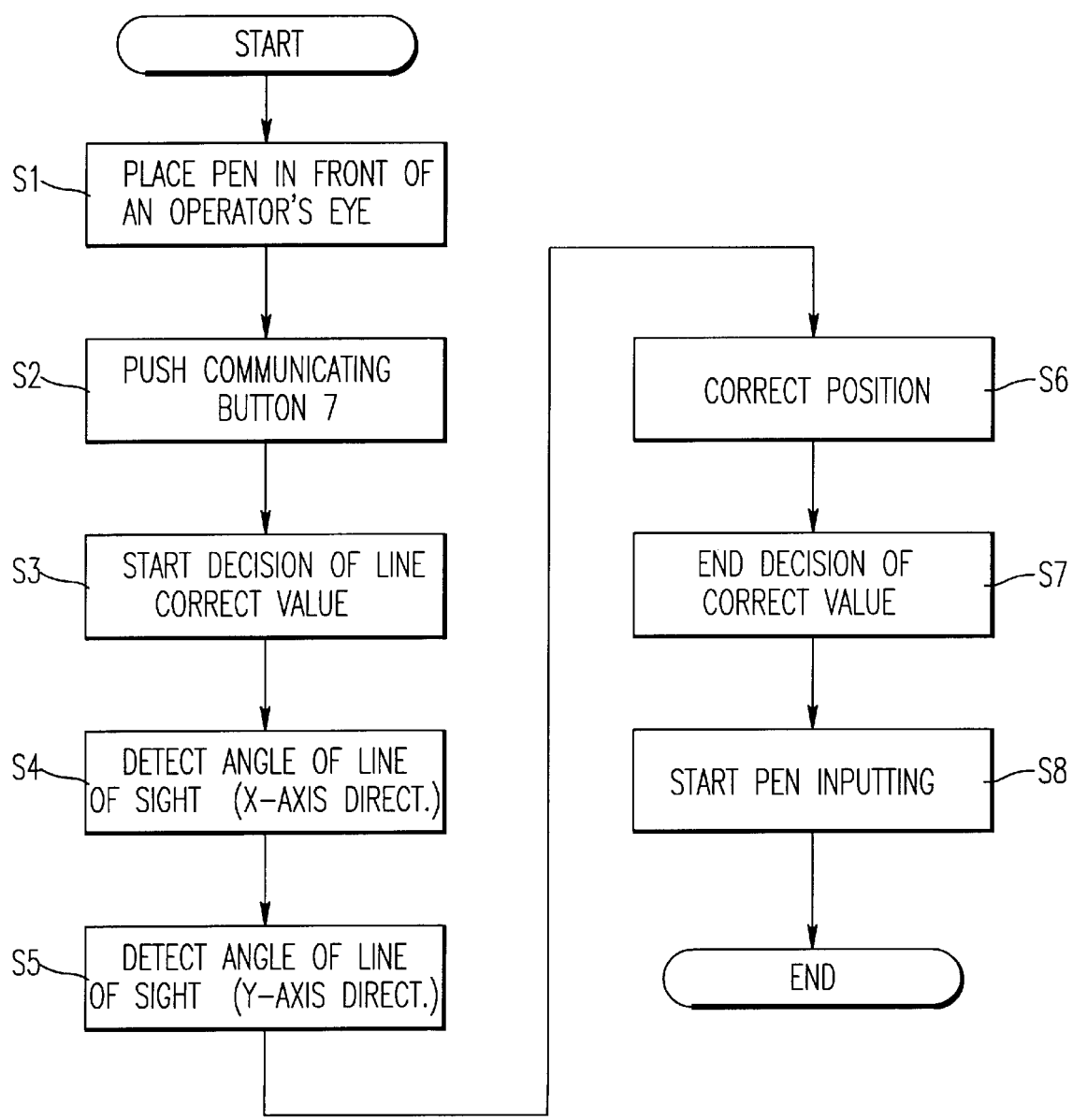
FIG. 3 is a flowchart of a process of a touch-screen display according to the present invention.

FIG. 3 is a flowchart of a process of the touch-screen display 1 of the present invention. When an operator uses this touch-screen display 1, first, a decision of a correction value is executed. At step S1, an operator places the pointing pen 5 in front of the operator's eye. FIG. 4 shows as an example a situation in which an operator places the pointing pen 5 in front of the operator's eye. At step S2, the operator pushes the communicating button 7 of the pointing pen 5. According to pushing the communicating button 7 by the operator, a process of a decision of a correction value starts, see step S3.

In the process of a decision of a correction value, photoreceptors 4a, 4b, 4c and 4d receive a light from the light-producing device 6 on the pointing pen 5 and a correction value is decided according to time differences of receiving the light by the photoreceptors 4a, 4b, 4c and 4d. A time difference in receiving the light about an X-axis direction Tx and a time difference of receiving the light about a Y-axis direction Ty are expressed by the following expression, in which K1 is a receiving time of light at the photoreceptor 4a, K2 is a receiving time of light at the photoreceptor 4b, K3 is a receiving time of light at the photoreceptor 4c and K4 is a receiving time of light at the photoreceptor 4d:

Tx=K1−K3,

Ty=K2−K4.

FIG. 5 is a diagram of a circuit for performing the time difference decision. The circuit for performing the time difference decision is a part of the view point detecting circuit 81. The circuit for performing the time difference decision includes a time-delay circuit 11a which delays an output signal from the photoreceptor 4a by a time T1, a time-delay circuit 11c which delays an output signal from the photoreceptor 4c by a time T1, a time-delay circuit 11b which delays an output signal from the photoreceptor 4b by a time T2 and a time-delay circuit 11d which delays an output signal from the photoreceptor 4d by a time T2. Moreover, the circuit for performing the time difference decision includes D-type flip-flop circuits (hereinafter expressed F/F) 12a, 12b, 12c and 12d.

In a case of Tx>T1, in other word, when the photoreceptor 4a does not receive a light from the light-producing device 6 until a time T1 after the photoreceptor 4c receives a light from the light producing device 6, an output Q of the F/F 12a is at a low level. And in a case of Tx<−T1, in other words, when the photoreceptor 4c does not receive a light from the light-producing device 6 until a time T1 after the photoreceptor 4a receives a light from the light-producing device 6, an output Q of the F/F 12c is at a low level.

In the example of positioning of the operator's eye as shown in FIG. 4, the distance between the photoreceptor 4a and the light-producing device 6 is longer than the distance between the photoreceptor 4c and the light-producing device 6. When a difference of the distances is larger than some predetermined value, the photoreceptor 4a does not receive a light from the light-producing device 6 until a time T1 after the photoreceptor 4c receives a light from the light-producing device 6, and thus Tx>T1 holds. Therefore, when Tx>T1 holds, the view point detecting circuit 81 detects that the position of the operator's eye, in other words an angle of a line of sight, is as shown in FIG. 4.

Figure 7:
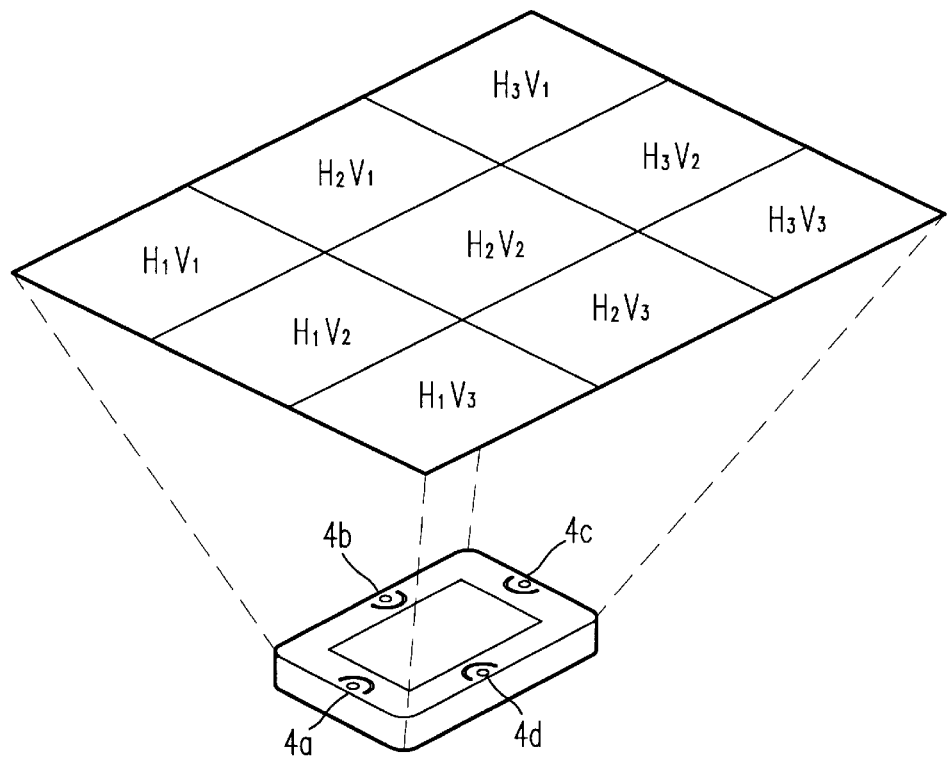
FIG. 7 is a diagram for expressing areas of an operator's eye according to the present invention.
Figure 8A:
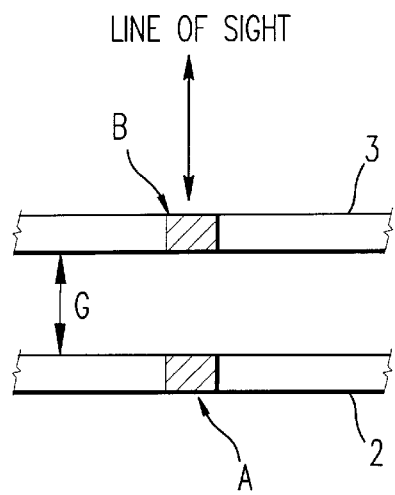
FIGS. 8a and 8b are diagrams for expressing a displacement of a display position and a touch position.
Figure 8B:
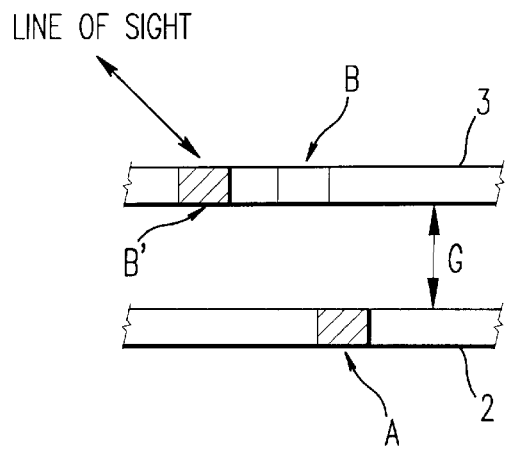

By these processes, the angle of a line of sight is detected according to the outputs from the F/Fs 12a, 12b, 12c and 12d (see step S4 and step S5 in FIG. 3). After these detecting steps, at step S6, the correction value decision circuit 82 in the control unit 8 decides the position of the operator's eye according to some condition, for example a table of FIG. 6. In FIG. 6, characters of the "position of operator's eye", for example "$H_1V_3$", may express nine areas such as shown in FIG. 7. The position of the operator's eye is decided according to the detected time differences in the X-direction and Y-direction.

The displacement of a display position and a touch position is small in the center of the touch-screen display 1. When a position of an operator's eye is $H_1V_3$, in other words lower left, the touch position deviates in a direction of lower left. In this case, a correction value of the X-axis is "+α", a correction value of the Y-axis is "+β". The correction value of the X-axis "+α" corrects the touch position of the X-axis in an upper direction and the correction value of the Y-axis "+β" corrects the touch position of the Y-axis to the right. Therefore, the displacement between a display position and a touch position is reduced.

The correction value is stored, for example in a RAM in the control unit 8, and the process for performing the decision of the correction value is then finished. In the embodiment shown, a position of an operator's eye falls within nine areas, however, more than nine areas can be adopted by increasing the delay circuits 11 and a number of F/Fs 12.

At step S8 in FIG. 3, after a decision of a correction value, an inputting position by the pointing pen 5 is started. In this inputting, a corrected coordinate value is generated by adding the correction value to the value from the touch panel control unit 10 in FIG. 2.

In this embodiment, the pointing pen 5 includes the light-producing device 6 and photoreceptors 4a, 4b, 4c, 4d placed around the touch panel 2. However, another system can be used. For example, the pointing pen 5 may have a sound source as a substitute for the light-producing device 6, and microphones can then be placed around the touch panel 2. In this system, when an operator pushes the communicating button 7, the sound source, for example a buzzer, outputs sound and more than one microphone receives the sound and detects a position of the operator,'s eye. Moreover, another flat display can be used as a substitute for the LCD panel, for example, a plasma display and FED.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an, appropriate network of conventional components, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

This application is based on Japanese patent application 8-260231 filed in the Japanese Patent Office on Sep. 9, 1996, the entire contents of which are hereby incorporated by reference.

What is claimed as new and desired to be secured by Letters Patent of the United States is:

1. A touch-screen display including a display panel and a touch panel which is layered on the display panel, comprising:
    a pointing pen for pointing to a position on said touch panel;
    a detecting unit for detecting a position of said pointing pen as an operator's view point prior to the pointing pen pointing to a position on said touch panel;
    a correction value decision unit determining a correction value according to the position of said pointing pen detected by said detecting unit;
    a correcting unit for correcting a pointing position pointed to by said pointing pen according to said correction value decided by said correction value decision unit.

2. A touch-screen display including a display panel and a touch panel which is layered on the display panel, comprising:
    a pointing pen for pointing to a position on said touch panel;
    a detecting unit for detecting a position of said pointing pen;
    a correction value decision unit determining a correction value according to the position of said pointing pen detected by said detecting unit;
    a correcting unit for correcting a pointing position pointed to by said pointing pen according to said correction value decided by said correction value decision unit,
    wherein said pointing pen includes a sending unit and said detecting unit includes more than one receiving unit, each receiving unit receiving a signal from said sending unit, and said correction value decision unit decides the correction value according to data from each of said receiving units.

3. A touch-screen display according to claim 2, wherein said sending unit includes a light-producing device and each of said receiving units includes a photoreceptor.

4. A touch-screen display according to claim 3, wherein said detecting unit includes four receiving units.

5. A touch-screen display according to claim 3, wherein said detecting unit includes a time different decision circuit calculating a time difference between light emitted from said sending unit and received at each of the receiving units.

6. A touch-screen display according to claim 5, wherein said detecting unit includes four receiving units.

7. A touch-screen display including a display panel and a touch panel layered on the display panel, comprising:
    pointing means for pointing to a position on said touch panel;
    detecting means for detecting a position of said pointing means as an operator's view point prior to the pointing means pointing to a position on said touch panel;
    correction value decision means for determining a correction value according to the position of said pointing means detected by said detecting means;
    correcting means for correcting a pointing position pointed to by said pointing means according to said correction value decided by said correction value decision means.

8. A touch-screen display including a display panel and a touch panel layered on the display panel, comprising:
    pointing means for pointing to a position on said touch panel;
    detecting means for detecting a position of said pointing means;
    correction value decision means for determining a correction value according to the position of said pointing means detected by said detecting means;
    correcting means for correcting a pointing position pointed to by said pointing means according to said correction value decided by said correction value decision means,
    wherein said pointing means includes ending means and said detecting means includes more than one receiving means, each receiving means receiving a signal from said sending means, and said correction value decision means decides the correction value according to data from each of said receiving means.

9. A touch-screen display according to claim 8, wherein said sending means includes a light-producing device and each of said receiving means includes a photoreceptor.

10. A touch-screen display according to claim 9, wherein said detecting means includes four receiving means.

11. A touch-screen display according to claim 9, wherein said detecting means includes a time different decision circuit means for calculating a time difference between light emitted from said sending means and received at each of the receiving means.

12. A touch-screen display according to claim 11, wherein said detecting means includes four receiving means.

13. A method of controlling a touch-screen display including a display panel and a touch panel which is layered on the display panel, comprising the steps of:
    pointing to a position on said touch panel with a pointing pen;

detecting a position of said pointing pen of an operator's view point prior to the pointing pen pointing to a position on said touch panel;

determining a correction value according to the position of said pointing pen detected by said detecting step;

correcting a pointing position pointed to by said pointing pen according to said correction value decided in said correction value determining step.

14. A method of controlling a touch-screen display including a display panel and a touch panel which is layered on the display panel, comprising the steps of:

pointing to a position on said touch panel with a pointing pen;

detecting a position of said pointing pen;

determining a correction value according to the position of said pointing pen detected by said detecting step;

correcting a pointing position pointed to by said pointing pen according to said correction value decided in said correction value determining step, wherein said pointing step sends a signal and said detecting step receives, at more than one receiving unit, the signal sent in said sending step, and said correction value is determined according to data from each of said receiving units.

15. A method of controlling a touch-screen display according to claim 13, wherein said sending step sends the signal from a light-producing device and each of said receiving units includes a photoreceptor.

16. A method of controlling a touch-screen display according to claim 15, wherein said detecting step receives the signal at four receiving units.

17. A method of controlling a touch-screen display according to claim 15, wherein said detecting step calculates a time difference between light emitted in said sending step and received at each of the receiving units.

18. A method of controlling a touch-screen display according to claim 17, wherein said detecting step receives the signal at four receiving units.

* * * * *